(12) United States Patent
Charpentier et al.

(10) Patent No.: US 7,412,036 B1
(45) Date of Patent: Aug. 12, 2008

(54) METHOD FOR ESTABLISHING A TELEPHONE CONNECTION BY VOICE CONTROL AND CORRESPONDING VOICE SERVER

(75) Inventors: Francis Charpentier, Trelevern (FR); Christel Sorin, New York, NY (US); Denis Jouvet, Lannion (FR); Laurent Ollier, Issy les Roulineaux (FR); Marc Fournier, Lannion (FR)

(73) Assignee: France Telecom, Paris (FR)

( * ) Notice: Subject to any disclaimer, the term of this patent is extended or adjusted under 35 U.S.C. 154(b) by 307 days.

(21) Appl. No.: 10/110,308

(22) PCT Filed: Oct. 13, 2000

(86) PCT No.: PCT/FR00/02860
§ 371 (c)(1),
(2), (4) Date: Apr. 11, 2002

(87) PCT Pub. No.: WO01/28209
PCT Pub. Date: Apr. 19, 2001

(30) Foreign Application Priority Data
Oct. 14, 1999 (FR) .................................. 99 12820

(51) Int. Cl.
*H04M 1/64* (2006.01)
*H04M 3/42* (2006.01)
*H04M 7/00* (2006.01)

(52) U.S. Cl. .............................. 379/88.03; 379/218.02; 379/220.01

(58) Field of Classification Search .... 379/88.01–88.04
See application file for complete search history.

(56) References Cited

U.S. PATENT DOCUMENTS

| | | | | | |
|---|---|---|---|---|---|
| 5,369,685 | A | * | 11/1994 | Kero | 379/88.04 |
| 5,719,921 | A | * | 2/1998 | Vysotsky et al. | 379/88.01 |
| 5,802,149 | A | * | 9/1998 | Hanson | 379/88.03 |
| 5,835,570 | A | * | 11/1998 | Wattenbarger | 379/88.03 |
| 5,901,214 | A | * | 5/1999 | Shaffer et al. | 379/211.02 |
| 5,910,981 | A | * | 6/1999 | Bhagat et al. | 379/219 |
| 5,991,364 | A | * | 11/1999 | McAllister et al. | 379/88.01 |
| 6,065,016 | A | * | 5/2000 | Stuntebeck et al. | 707/200 |
| 6,741,677 | B2 | * | 5/2004 | Reformato et al. | 379/88.01 |

FOREIGN PATENT DOCUMENTS

| | | | |
|---|---|---|---|
| EP | 0 800 304 A2 | 10/1997 | |
| EP | 0 823 809 A2 | 2/1998 | |

* cited by examiner

*Primary Examiner*—Fan Tsang
*Assistant Examiner*—Joseph T Phan
(74) *Attorney, Agent, or Firm*—Pearne & Gordon LLP

(57) ABSTRACT

Voice-activated telephone call connection method and corresponding voice server.

According to the invention, the voice server (SV) comprises customised directories ($A_1, A_2, A_3, \ldots$) associated with voice recognition patterns ($M_1, M_2, M_3, \ldots$). These directories are continually updated. The request from the user ($U_1, U_2, \ldots$) is processed, firstly, by the voice server using the customised directory and, if the request is not successful, secondly, using the public directory (30), with the same dialog.

7 Claims, 1 Drawing Sheet

METHOD FOR ESTABLISHING A TELEPHONE CONNECTION BY VOICE CONTROL AND CORRESPONDING VOICE SERVER

FIELD OF THE INVENTION

The present invention relates to a voice-activated telephone call connection method and a corresponding voice server.

STATE OF THE RELATED ART

To facilitate telephone calls by enabling the user to avoid keypad dialling, several solutions are studied by different laboratories and players in the field of telecommunications.

The article by R. BILLI et al. entitled "Automation of Telecom Italia Directory Assistance Services: Field Trial Results" published in "Proceedings of IVTTA 98", pp. 11-16, Turin, Italy, 1998, discloses a fully automatic directory with transfer to an operator in the event of a problem. In this system, the subscriber is prompted to give the name of the target region, followed by the name of the town or city, street, followed by the surname and first name of the party being searched. The voice directory is restricted to parties from the same town or city. If the party is not listed in the directory, the request is transferred to an ordinary operator service.

The patent U.S. Pat. No. 5,835,570 discloses a personal voice telephone directory obtained by retrieving the telephone number contained in the public directory. The voice directory is based on a voice label technique, wherein the definition is given by the user in person and recorded with their own voice. The data retrieved from the public directory only consists of that corresponding to the telephone number and the voice label defined by the user is used as the basis for the personal voice recognition pattern. An update of the personal directory is also provided but only on calls made by the user (outgoing calls). The telephone numbers stored in the personal directory are not updated if the data in the public directory is modified (if party moves, etc.).

Therefore, this technique offers relatively limited performances.

The precise aim of the present invention is to propose a more advanced technique which enables a complete update of the user's personal directory, while retaining the same type of dialog between the user and their customised directory or the public directory.

DESCRIPTION OF THE INVENTION

To this end, the invention proposes a voice-activated telephone call connection method, of a requesting subscriber with a requested party belonging to a set of parties listed in a public voice directory, wherein the call between the requesting subscriber and the requested party is connected by a voice server, said method being characterised in that:

in the voice server, and for each subscriber, firstly, a customised directory is created which is obtained by extracting from the public voice directory all the information relating to the parties known to the subscriber, and, secondly, a voice recognition pattern associated with each customised directory is created, each customised directory and its associated recognition pattern are continually updated according to the corresponding subscriber's incoming and outgoing calls, or numbers indicated by the subscriber to be added to or deleted from his customised directory, the data relating to each party contained in each customised directory is updated according to changes in the data relating to said party contained in the public directory.

The present invention also relates to a voice server implementing said method. The voice server comprises:

a plurality of customised directories with their associated voice recognition patterns, each customised directory being assigned to a specific subscriber, a permanent link with a public directory, recognition patterns associated with said public directory, means to update each customised directory continually according to the corresponding subscriber's incoming and outgoing calls, or numbers indicated by the subscriber to be added or deleted, means to update each customised directory, relating to each party it contains, according to changes in the data relating to said party contained in the public directory.

BRIEF DESCRIPTION OF FIGURES

The single FIGURE appended is a synoptic diagram illustrating the method according to the invention and the structure of the voice server.

DETAILED DESCRIPTION OF SPECIFIC EMBODIMENTS

Figure 1:
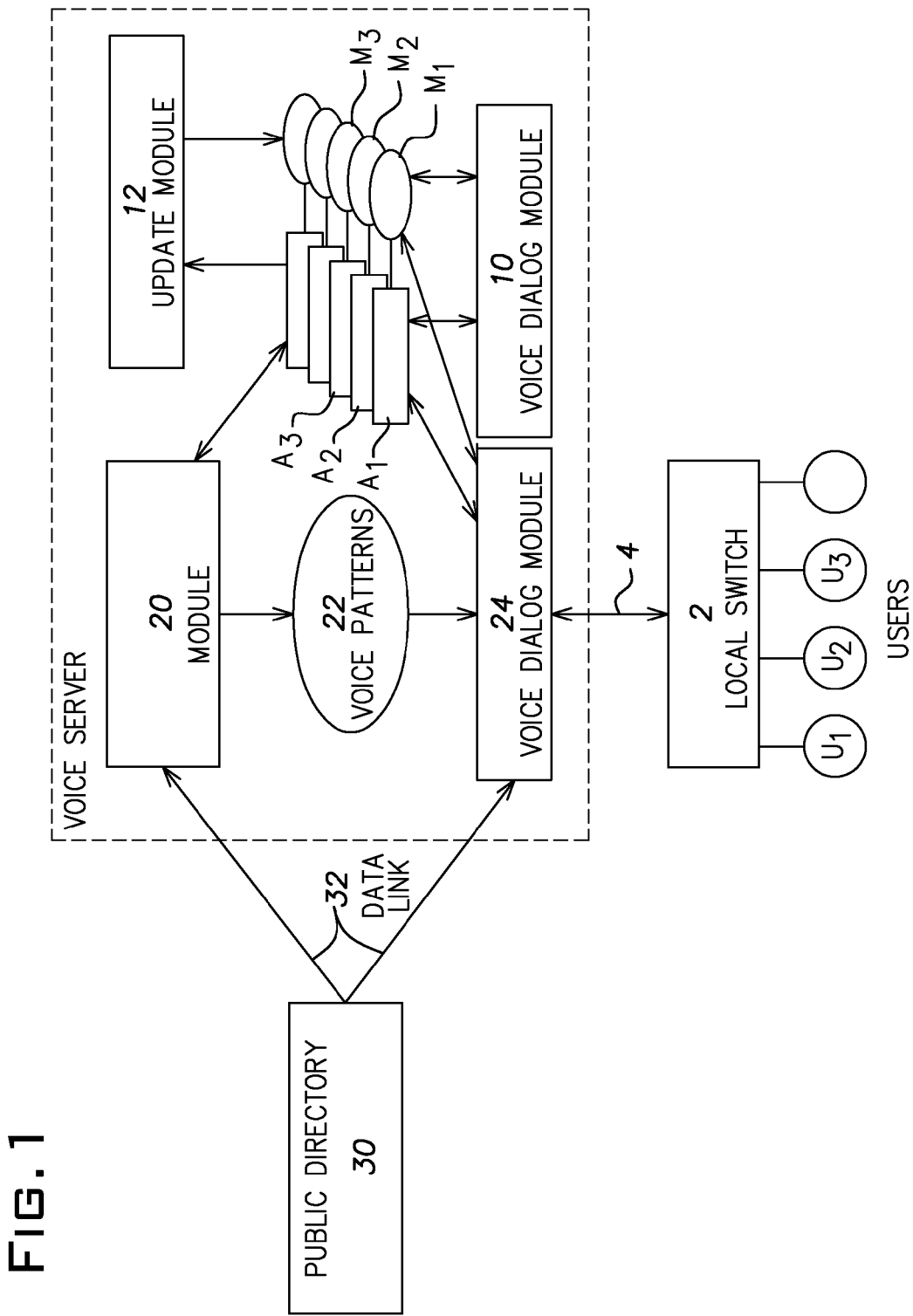

The following terms hereafter refer to:

customised voice directory:

either a voice directory specific to an individual; this directory contains a list of parties specific to the individual;

or a voice directory associated with a legal entity such as a company, business, association, etc.; this directory contains the list of people working in the legal entity and a list of parties specific to the legal entity;

public voice directory, a general directory of all the subscribers of a telecommunications operator, or of several telecommunications operators operating in the same geographic area (limited to a region, country or set of countries), or even operating world-wide. This directory particularly comprises residential listings and business listings.

According to the invention, a customised voice directory is built like a large-capacity voice directory, but with a restricted part of public voice directory data. Therefore, it is a "restricted" directory. This concept is justified in that all the numbers actually used by a subscriber do not exceed a limited number, not more than a few thousand and very probably less than one thousand for most people. For a company, the number is higher, and will increase according to the size of the company. However, it will also remain limited and largely below the number of subscribers contained in the public directory. The fact that the restricted directory is much smaller than the public directory increases the technical feasibility of the voice directory service, since the voice recognition covers a much more limited vocabulary than for the public directory. This improved feasibility is particularly made use of to offer simple, user-friendly ergonomics.

The invention offers a two-level connection service, articulating a first customised directory level (individual, company, community) of a large capacity (liable to contain up to several thousand words), and a second fully automated public directory level. In the majority of cases, the user will only access the first level, since he will request calls with parties he has already called or who have already called him, and will only use the second level for parties that he has never called or who have never called him, by extracting a new number from the public directory. In other words, the subscriber almost always uses the numbers stored in his call log, incoming calls and outgoing calls; this log may exist from a start date (which may be the subscriber's date of birth).

As an illustration, examples of the size of the directories involved are as follows:
- the public directory comprises several tens of millions of subscribers,
- the customised directory is limited to all parties, i.e. a few thousand for one person, and liable to reach tens of thousands for legal entities such as large companies.

An important aspect of the service offered by the invention is that the same dialog is proposed, in both levels. It is shorter for the customised directory (since the system finds the solution in less time), than for a public directory search. Switching from one to the other is indicated by the following type of message:

"you have never called this party, I will now search in the full directory".

As an illustration, some examples of dialogs may be given. The letter SV represents the voice server and the letter U the user:

EXAMPLE 1

Using the Customised Directory

SV: Personal voice directory. Who do you want to call?
U: <First name and surname of a party listed in the listed customised directory>
SV: Confirm name. I am now putting you through.

EXAMPLE 2

Using the Customised Directory

SV: Personal voice directory. Who do you want to call?
U: <First name and surname of a party listed in the listed customised directory>
SV: Do you know the town or city?
U: Yes. <Name of locality>
SV: Confirm name and locality. I am now putting you through.

EXAMPLE 3

Using the Public Directory

SV: Personal voice directory. Who do you want to call?
U: <First name and surname of a party listed in the listed customised directory>
SV: Do you know the town or city?
U: Yes. <Name of locality>
SV: You have never called this party, I will now search in the full directory. Can you spell the party's surname?
U: Yes. <Spells surname>
SV: Is it "name" residing in "locality"?
U: Yes, probably.
SV: Do you want to be put through?
U: Yes FIG. 1 shows a possible architecture of the system and more particularly of the voice server. The users $U_1$, $U_2$, $U_3$, ... communicate with the voice server SV via a local switch 2 and a telephone line 4. As shown, the voice server SV comprises customised directories $A_1$, $A_2$, $A_3$, ... associated with voice recognition patterns $M_1$, $M_2$, $M_3$, ..., a voice dialog application module 10 linked with the customised directories and voice recognition patterns, an update module 12 for the voice recognition patterns using written data. The voice server also comprises a module 20 to update the customised directories and ensure consistency with the public directory, a set 22 of voice patterns corresponding to the public directory, a voice dialog application module 24 to access the public directory. The assembly represented also comprises a public directory 30 linked to the voice server via a data link 32.

This assembly operates as follows:
- the subscriber contacts the voice server, and is processed with a first dialog level handling access to his customised directory; the data used is the customised directory composed of an extract from the public directory and the corresponding voice recognition pattern,
- if the party's name and details are recognised at this level, the voice server connects the call by routing it to the party (by checking the switch in "service node" mode or via the intelligent network in intelligent peripheral mode),
- if the party's name and details are not found, the dialog is processed using a second dialog level, which handles access to the public directory; the data used is the public directory (via the link) and the corresponding voice pattern, which is in the server,
- if the party's name and details are recognised at this level, the voice server connects the call by routing it to the party (by checking the switch in "service node" mode or via the intelligent network in intelligent peripheral mode), and the customised directory is updated along with its associated voice recognition pattern,
- if the request persistently fails, the subscriber is put through to a human operator at a call centre.

The update of the voice server customised directory data makes it possible to ensure the consistency of the following data with the public directory:
- the customised directories for each of the subscribers to the service,
- the voice recognition patterns associated with the customised directories,
- the voice recognition pattern of the public directory.

This process comprises a call log function, for the calls made by the user either via the voice directory service itself, or using a conventional method (dialling the number on the keypad or vocally), but also for calls received by the user. The directory is updated whenever the call log detects a new party who is not already present in the directory.

Finally, it is possible to initialise or enhance a customised directory using predefined directories (proposed by the telecommunications operator, for example), or by inheriting directories from other people (parents for example), subject to the explicit agreement of the other people.

The customised directory is by nature a constantly growing directory, but the update mechanism may include mechanisms to delete unnecessary entries, according to various criteria. For example, any number which has not been called back for a period greater than a predefined time is deleted; for a person, the time may be longer than for a company. This mechanism is configurable at service subscriber management level.

The structure of the customised directories is derived from the structure of the public directory, by extracting all (or part) of the entries for the subscriber's previous parties, using all (or part) of the fields in the public directory database. The mandatory fields to be present are: first name, surname, locality, address, county, telephone number. Since the connection service does not use telephone numbers ("numberless dialling" type service), the number is used as an internal address, that the subscriber does not necessarily need to know.

The system according to the invention may use, for the voice recognition pattern update module, software applications well known to those skilled in the art, such as for example the "flexible recognition module" of the PHIL90 and PHILSOFT voice recognition technology developed by FRANCE TELECOM, and marketed by ALCATEL TITN ANSWARE, MG2 Technologies, HOLISTIQUE COMMUNICATION.

The principle of said modules consists of converting words or expressions to be recognised, given in written form, generally spelt or phonetically in some cases, in a computer data set, said set being referred to as a voice recognition pattern, which enables a voice recognition system to recognise said words or expressions. Said module comprises a phonetic conversion module for the written data, which converts words or expressions given in spelt form into a phonetic description, an assembly module of the recognition pattern using the phonetic description and the required grammar for the voice phrases, and the elementary voice patterns for each phoneme of the language. Naturally, these flexible recognition modules are language-dependent.

The voice dialog applications may be produced using known techniques and products, for example the voice application generators and monitors offered by MG2 Technologies. A tool referred to as a voice application generator is used to describe the voice exchanges between the voice server and the user. This tool offers the voice application designer a graphical interface or a high-level computer language (script language). This tool can then be used to compile the voice application in a "run-time" form, run by a voice application monitor. The voice applications may also be produced without using an application generator, using a simple computer program describing all the cases of interaction between the voice server and the user.

The invention claimed is:

1. A method of voice activated telephone call connection between a requesting subscriber among a plurality of subscribers, and a requested party; said requested party belonging to a set of parties listed in a public voice directory, wherein the call is connected by a voice server, said method comprising the steps of:
for each subscriber of the plurality of subscribers: creating in the voice server a customized directory which is obtained by extracting all information relating to parties known to each of the subscribers from the public voice directory, and creating in the voice server a voice recognition pattern associated with the customized directory;
processing the requesting subscriber's request in the customized directory corresponding to said requesting subscriber, and if the requested party is not contained in the subscriber's customized directory, then processing the requesting subscriber's request in the public directory;
continually updating each customized directory and its associated voice recognition pattern according to:
incoming and outgoing calls of the requesting subscriber corresponding to the customized directory, whenever a new party of an incoming or outgoing call is detected who is not already present in said customized directory, and
numbers indicated by the corresponding requesting subscriber to be added to or deleted from the customized directory; and
updating data relating to each party contained in each customized directory according to changes in data relating to said party contained in the public voice directory.

2. Method according to claim 1, wherein the same type of dialog is used between the requesting subscriber and the voice server for the customized directories and for the public directory.

3. Method according to claim 1, wherein the customized directories are assigned to individual subscribers.

4. Method according to claim 1, wherein the customized directories are assigned to legal entity subscribers.

5. Voice server for voice-activated telephone call connection, said voice server implementing the method according to claim 1, and comprising:
a plurality of customized directories having associated voice recognition patterns, each of said plurality of customized directories being assigned to a specific subscriber,
a permanent link with a public directory,
recognition patterns associated with said public directory,
means to update each of said plurality of customized directories continually according to incoming and outgoing calls of the corresponding requesting subscriber, or according to numbers indicated by the corresponding requesting subscriber to be added or deleted from the customized directory,
means to update each customized directory, relating to each party contained, according to changes in data relating to said party contained in the public directory.

6. Voice server according to claim 5, wherein each customized directory is assigned to an individual subscriber.

7. Voice server according to claim 5, wherein each customized directory is assigned to a legal entity subscriber.

* * * * *